US008588378B2

(12) United States Patent
Davies et al.

(10) Patent No.: US 8,588,378 B2
(45) Date of Patent: Nov. 19, 2013

(54) HIGHLIGHTING OF VOICE MESSAGE TRANSCRIPTS

(75) Inventors: Benedict Davies, London (GB); Christian Brunschen, London (GB)

(73) Assignee: Google Inc., Mountain View, CA (US)

( * ) Notice: Subject to any disclaimer, the term of this patent is extended or adjusted under 35 U.S.C. 154(b) by 628 days.

(21) Appl. No.: 12/837,322

(22) Filed: Jul. 15, 2010

(65) Prior Publication Data

US 2011/0013756 A1    Jan. 20, 2011

Related U.S. Application Data

(60) Provisional application No. 61/225,873, filed on Jul. 15, 2009.

(51) Int. Cl.
*H04M 11/00* (2006.01)
(52) U.S. Cl.
USPC .............. 379/88.14; 379/88.04; 379/88.11; 379/88.13; 379/88.22; 455/413; 455/414.4; 704/276; 704/277; 709/202
(58) Field of Classification Search
USPC ............................... 709/201–207, 217–248; 348/14.01–14.16; 370/259–271, 370/351–357; 379/67.1–88.28; 455/412.1–426.2, 456.1–466, 455/550.1–560, 575.1–575.9, 90.1–90.3; 704/270–278
See application file for complete search history.

(56) References Cited

U.S. PATENT DOCUMENTS

| 5,003,574 | A | | 3/1991 | Denq et al. |
| 5,742,736 | A | | 4/1998 | Haddock |
| 5,748,974 | A | | 5/1998 | Johnson |
| 5,760,773 | A | * | 6/1998 | Berman et al. ................. 715/808 |
| 5,832,171 | A | | 11/1998 | Heist |
| 6,017,219 | A | | 1/2000 | Adams, Jr. et al. |
| 6,282,510 | B1 | | 8/2001 | Bennett et al. |
| 6,324,511 | B1 | * | 11/2001 | Kiraly et al. .................. 704/260 |
| 6,377,925 | B1 | | 4/2002 | Greene et al. |
| 6,421,645 | B1 | | 7/2002 | Beigi et al. |
| 6,745,163 | B1 | | 6/2004 | Brocious et al. |
| 6,876,729 | B1 | | 4/2005 | Kuter et al. |
| 6,912,581 | B2 | * | 6/2005 | Johnson et al. ............... 709/228 |
| 6,928,407 | B2 | | 8/2005 | Ponceleon et al. |
| 7,092,496 | B1 | | 8/2006 | Maes et al. |
| 7,117,152 | B1 | | 10/2006 | Mukherji et al. |

(Continued)

FOREIGN PATENT DOCUMENTS

EP    1 126 436    8/2001

OTHER PUBLICATIONS

Bird, Steven and Mark Liberman. "A Formal Framework for Linguistic Annotation." Aug. 13, 1999, 37 pages.

(Continued)

*Primary Examiner* — Hemant Patel
(74) *Attorney, Agent, or Firm* — Fish & Richardson P.C.

(57) ABSTRACT

A computer-implemented voice mail method includes obtaining an electronic audio file of a recorded user message directed to a telephone user, automatically generating a transcript of the recorded user message, and identifying locations in the transcript in coordination with timestamps in the recorded user message so that successive portions of the transcript can be highlighted in coordination with playing of the recorded user message. The method also include identifying one or characteristics of the message using meta data relating to the recorded user message, and storing the recorded user message and information about the identified locations of the recorded user message.

37 Claims, 7 Drawing Sheets

(56) References Cited

U.S. PATENT DOCUMENTS

| | | | |
|---|---|---|---|
| 7,164,410 B2* | 1/2007 | Kupka | 345/156 |
| 7,270,546 B1 | 9/2007 | Adams, Jr. et al. | |
| 7,330,815 B1 | 2/2008 | Jochumson | |
| 7,366,671 B2 | 4/2008 | Xu et al. | |
| 7,386,452 B1* | 6/2008 | Bates et al. | 704/270 |
| 7,412,643 B1 | 8/2008 | Fischer et al. | |
| 7,527,498 B2 | 5/2009 | Matsoff | |
| 7,574,675 B1* | 8/2009 | Linker et al. | 715/841 |
| 7,590,536 B2 | 9/2009 | Bates et al. | |
| 7,693,267 B2 | 4/2010 | Howell et al. | |
| 7,729,478 B1 | 6/2010 | Coughlan et al. | |
| 7,778,397 B2 | 8/2010 | Erhart et al. | |
| 7,782,365 B2 | 8/2010 | Levien et al. | |
| 8,059,790 B1 | 11/2011 | Paterik et al. | |
| 8,131,545 B1 | 3/2012 | Moreno et al. | |
| 8,300,776 B2* | 10/2012 | Davies et al. | 379/88.11 |
| 2003/0128820 A1 | 7/2003 | Hirschberg et al. | |
| 2005/0033753 A1 | 2/2005 | Mundell et al. | |
| 2005/0069095 A1 | 3/2005 | Fellenstein et al. | |
| 2008/0273675 A1 | 11/2008 | Sminoff | |
| 2008/0312934 A1 | 12/2008 | Cerra et al. | |
| 2009/0141875 A1 | 6/2009 | Demmitt et al. | |
| 2009/0276215 A1 | 11/2009 | Hager | |
| 2009/0325603 A1* | 12/2009 | Van Os et al. | 455/456.2 |
| 2010/0177877 A1* | 7/2010 | Hamaker et al. | 379/88.14 |
| 2010/0240402 A1 | 9/2010 | Wickman et al. | |

OTHER PUBLICATIONS

International Search Report & Written Opinion for Application No. PCT/US2010/042165, dated Oct. 20, 2010, 12 pages.

Wactlar, Howard, Alexander Hauptmann, Michael G. Christel, Ricky A. Houghton, and Andreas M. Olligschlaeger. "Complementary Video and Audio Analysis for Broadcast News Archives." Carnegie Mellon University Research Showcase, Computer Science Department: School of Computer Science, Feb. 1, 2000, 11 pages.

Kaminski, Chris. "Much Adu About Smart Tags." A List Apart; Jul. 22, 2001. Retrieved from the Internet <URL: http://www.alistapart.com/articles/smarttags/> (15 pages).

Qi, Wei, Lie Gu, Hao Jiang, Xiang-Rong Chen, and Hong-Jiang Zhang. "Integrating Visual, Audio and Text Analysis for News Video." Believes to have been publicly available on or before Jul. 15, 2010; Microsoft Research, Beijing, China. (4 pages).

Wikipedia. "Smart Tag (Microsoft)." Believes to have been publicly available on or before Jul. 15, 2010. Retrieved from the Internet <URL: http://en.wikipedia.org/wiki/Smart_tag_(Microsoft)> (2 pages).

Authorized Officer S. Baharlou. International Preliminary Report on Patentability in International Application No. PCT/US2010/042165, issued Jan. 17, 2012, 7 pages.

Zhu et al. "Combining speaker identification and bic for speaker diarization," in Proceedings Interspeech, 2005, 4 pages, Sep. 2005.

\* cited by examiner

| Verbs | Subjects |
|---|---|
| Search | Word |
| Map | Phrase |
| Shop/Buy | Context |
| Navigate | Sentence |
| Email | Message |
| Text | Address |
| Chat | Product |
| Ticket | Name |
| | Event |
| | Route |

FIG. 4

HIGHLIGHTING OF VOICE MESSAGE TRANSCRIPTS

CROSS-REFERENCE TO RELATED APPLICATIONS

This application claims priority to U.S. Provisional Application Ser. No. 61/225,873, filed on Jul. 15, 2009, entitled "Highlighting of Voice Message Transcripts," the entire contents of which are hereby incorporated by reference.

TECHNICAL FIELD

This document relates to systems and techniques for highlighting portions of transcripts of voice mail messages, and other transcripts.

BACKGROUND

Voice mail is familiar to anyone who has used a telephone in recent times. Voice mail is a feature by which telephone callers can leave a message for callees who are not available to answer a call, and to have the message electronically stored so that it can be reviewed by the callee later in time when the callee becomes available. Various systems may permit a user to see information about their voice mails, such as caller ID information for the caller, the time when the message was left, and other such information. Callees can review their voice mails in various systems either through a basic telephone, through their computer such as a desktop or laptop computer, or through a smartphone that combines telephony and computing capabilities into a portable wireless handset system.

SUMMARY

This document describes systems and techniques that may be used to create transcripts from voice mail messages left by callers, and to display the transcripts in synchronization with the corresponding voice messages for a callee. In one example, a transcript may first be made by applying text-to-speech translation in one or more familiar manners to a voice mail message recording, and assigning time-stamped tags for each syllable, word, or other divider in the message. The time-stamped tags may then be used when the message is played back, by permitting coordination of the transcript with the time on the recording. As one example, one of various forms of highlighting may be applied to the text as the message is played so as to visually synchronize the highlighting with the position in the audible message. An area around the central highlighting (which may focus on a syllable or word) may further call attention to context around the central highlighting, and its size may change depending on the length of the context. The particular context can depend on the speaker's speed, inflection, and tone, among other things, and can also be identified by performing textual analysis on the text around the word or words that are the focus of the highlighting. A user may also touch on the highlighting and move it to another location in the transcript that is different than the current location in the transcript, and the audio playing of the message may automatically jump to the location in the audio file that corresponds to the selected location in the transcript.

A user may further provide commands that can be executed on the highlighted text, such as to submit the text to a search engine (e.g., for shopping search, regular web search, map search, etc.). Such user interaction may occur verbally so that the user need not take their attention away form whatever they were already doing. The commands can be determined to be associated with a particular content type, such as by associating a command "map that" (which may be supplied verbally by a user) to a content type of "address." Terms in the transcript may similarly be correlated to content types, such as an address "444 oak street" being parsed from the transcript in known manners and associated with the content type "address." When the device receives the command "map that," it may identify the "address" content type for the command, and may then search for instances of content in the transcript text that have the "address" content type, and may then automatically use the content as a parameter for a mapping command. For example, it may send "444 oak street" to a server-based maps service in a known manner, so that the mobile device may display a map around the address, or from the user's current location to the address (where the current location may be determined by known mechanisms such as GPS and cell tower triangulation, and the user may be provided with turn-by-turn navigation assistance to the address).

In certain implementations, such systems and techniques may provide one or more advantages. For example, visual information provided to a user can give an enhanced understanding within the transcript of the emotional tone and cadence characteristics of the voicemail. Indications of such factors can include volume or amplitude, velocity, intonation, and emphasis. Such determinations may also be provided to an automatic analysis system to generate workflow or other actions on a message (e.g., if a user wants to have "angry" messages forwarded immediately to them). In addition, where the contextual information that surrounds a current location in a playing transcript includes word groups or clusters around the current word, and those groups or cluster represent a particular topic, a user may easily perform a number of operations on the topic, such as performing a search, forwarding a message, generating a map, and the like—and can, in some implementations, do so by simple voice commands. Thus, a user may perform a number of operations while staying in the context of the voice mail message topic, and with minimal effort.

In one implementation, a computer-implemented method is disclosed that comprises obtaining an electronic audio file of a recorded user message directed to a telephone user, and automatically generating a transcript of the recorded user message. The method further comprises identifying locations in the transcript in coordination with timestamps in the recorded user message so that successive portions of the transcript can be highlighted in coordination with playing of the recorded user message, identifying one or characteristics of the message using meta data relating to the recorded user message, and storing the recorded user message and information about the identified locations of the recorded user message. The method can also comprise providing the recorded user message to the telephone user and providing the transcript and data for displaying the transcript with highlighting that shows the identified locations along with one or more areas adjacent to the identified locations, wherein the one or more areas are identified using the one or more characteristics of the message.

In certain aspects, the method can also include providing, in coordination, the recorded user message audibly to the telephone user and the transcript visually to the user. Providing the transcript in coordination with the recorded user message can comprise moving a highlighted area across the transcript in a manner that matches a current location in the message while it is played. Also, identifying one or more characteristics of the message can include identifying a group of contiguous words in the transcript that make up a common topic. Such a method can also comprise receiving a user command and performing the user command on the group of contiguous words, without receiving an identification by the user of any one of the contiguous words. Performing the user command can additionally comprises performing a web search on the group of contiguous words. Also, the group of contiguous words can define an address, and the method can include performing the user command comprises generating a map for a geographic area around the address.

In another implementation, a computer-implemented voice mail system includes an audio file data store storing a plurality of digitized voice mail message directed to one or more users of the voice mail system, a transcript data store storing a plurality of voice mail transcripts, each corresponding to a voice mail message stored in the audio file data store, and a voice mail player including an audio player and a transcript manager programmed to present a transcript while playing an audio file of a message and to show highlighting of transcript at a location corresponding to a current location of the playing audio file, wherein the a visual form of the highlighting depends on one or more characteristics of the message that are determined using meta data relating to the recorded user message.

In another implementation, a computer-implemented voice mail system is disclosed that includes an audio file data store storing a plurality of digitized voice mail message directed to one or more users of the voice mail system, a transcript data store storing a plurality of voice mail transcripts, each corresponding to a voice mail message stored in the audio file data store, and means for presenting an audio file from the audio file data store in coordination with a corresponding transcript with information generated by analyzing meta data relating to a message in the audio file.

The details of one or more embodiments are set forth in the accompanying drawings and the description below. Other features and advantages will be apparent from the description and drawings, and from the claims.

DESCRIPTION OF DRAWINGS

FIG. 4 shows lists of verbs and subjects that a user may employ in commands to a voice mail management system

Like reference symbols in the various drawings indicate like elements.

DETAILED DESCRIPTION

Figure 1:
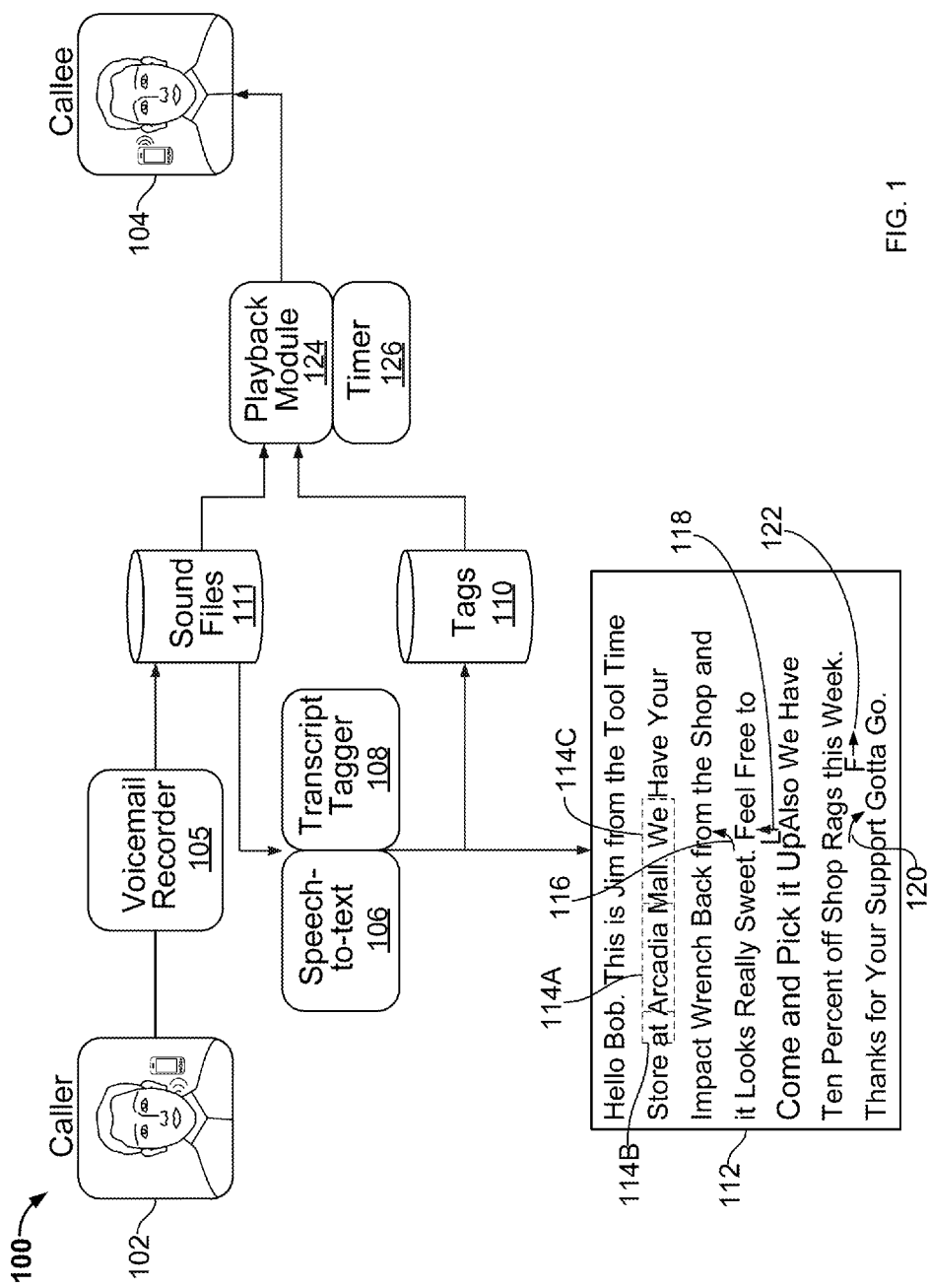
FIG. 1 is a conceptual diagram of a voice mail message system having transcripts coordinated with messages.

This document describes systems and techniques for creating and displaying a transcript of a voice mail message in coordination with audible playing of the message. The transcript may be shown in certain implementations with visual items that indicate audible characteristics of the message, such as speed of the message at various points in the message, volume, and intonation. The speed of the message may be indicated, for example, by a highlighted area around the current location in the transcript, where the distance to which the highlighting extends from the current position depends on the speed of the message in that particular direction.

In addition, or alternatively, word analysis may be performed on the transcript in order to find groups of words that belong together in the message, such as words that together represent addresses, people's names, names of venues (e.g., arenas, bars, stores, etc.), holidays, movie titles, names of products, and the like. Such groups of words may also be highlighted, including by highlighting the group when the recording being played is on one of the words in the group, and the highlighted groups of words may be conveniently acted upon by commands that a user provides to their telephone. Identified words or groups of words may also be correlated to a content type for the content, where the content type represents a common class for which various instances of content are representative. Content classes, may include, for example, addresses; names of people, companies, and organizations; dates; shipping numbers (e.g., USPS, UPS, Fed Ex, etc., with an associated command of "track that"); company names and stock ticker symbols (e.g., a command of "graph that" or "quote that" to get a stock quote).

For example, if a group of words that represent an address is displayed and the user says "map that," the user's telephone may be caused to generate a map surrounding the address. Similarly, if a user says "dial him," the device may identify terms in the transcript that are associated with the content type "person" or "name," or can compare words or terms in the transcript with all the names in a user's contacts list, and can then automatically dial the person named in the transcript, without the user having to speak the name—i.e., the system determines the context for the users command automatically by looking to the content of the transcript in order to narrow the possible contexts that the user might have intended. Other similar actions may be taken conveniently with respect to information in a voice mail transcript, as described in more detail below.

Where there are multiple instances of a certain content type in one displayed document or currently displayed viewport of the document, so that the user's input is ambiguous, the ambiguity may be cleared in certain manners. For example, each of the instances of content may be displayed in a pop-up window next to a numeral, and the user can speak the numeral to have the prior command applied to the content that is associated with the spoken numeral. For example, a transcript may say: "We're starting the party at 123 Main Street, and then heading to 444 Oak Street." A pop-up window generated in response to the command "map that" or "navigate that" (to get a map and turn-by-turn driving directions) may include the content: "1. 123 Main Street 2. 444 Oak Street."

FIG. 1 is a conceptual diagram of a voice mail message system 100 having transcripts coordinated with messages. In general, the system 100 may provide voice mail services to a plurality of users of a telephony system it may be made openly available to other users to leave messages, much like common voice mail systems. Each registered user may establish routing rules that handle calls made to their telephone number, and route them to other telephone numbers that may be assigned to the user. In addition, the user may assign rules for routing incoming calls to a voice mail subsystem by system 100, where the sub-system records messages from callers and makes the messages available for review by each relevant registered user to which the calls are directed. In this example, the system 100 allows registered users, not only to review voice mail messages that have been left for them, but to also see transcripts of the messages and to be provided with those transcripts in a manner that is coordinated with the playing of the audio of the messages.

As shown in FIG. 1, a caller 102 makes a call to callee 104, who is not currently answering or who has ruled that all calls from caller 102 should be diverted to voice mail. The caller 102 may be instructed by the system 100 to leave a message which may be captured by a voicemail recorder 105, in a variety of familiar manners. The voicemail recorder 105 may digitize the message into a file that is stored in sound files data store 111. The voicemail recorder 105 may also generate meta data relating to the message, such as caller identification information for the caller 102, a timestamp for when the message was received, a timestamp indicating the length of the message, and other similar information.

At a time when a message is received or a later time, a sound file of a particular message may be submitted to a speech-to-text converter 106. The speech-to-text converter 106 may also take a variety of familiar forms, and is preferably a converter that may operate with reasonable accuracy across a plurality of different users and without the need for training for a particular user. The speech-to-text converter 106 may produce a transcript of the message, and that transcript may be used in various familiar manners, such as by coordinating a transcript to an electronic mail message so that the callee may immediately review content of the message (without having to call in for voice mails) and determine how to react.

Additional metadata about a transcript may also be generated in the form of a time-stamp applied to the transcript. Such time-stamps may be associated with locations in the transcript, such as at the start of a particular word or syllable in the transcript. Alternatively, the timestamps may be regular, such as every tenth or quarter second, and the progress of the message file at the particular times may be recorded, such as in the form of an integer index that indicates which word or syllable in the transcript is being spoken at the point of that timestamp. A transcript tagger 108 may interoperate with the speech-to-text converter and may correlate elements such as words in a transcript with times in the message. Such correlation may permit later correlation to occur when the message is played back to the callee along with the display of the transcript, including highlighting that is animated in the transcript.

The tagging information, such as identification of words, and times during the message at which those words occur, may be stored in a tags data store 110. The data store 110 may be separate from or combined with the sound files data store 111, though the data in each may be stored in a manner so that the transcript and sound file may be coordinated during later playback of the message. As one example, each word or syllable in a transcript may be number from 1 to X, and a table may correlate such integer digits each with a time stamp that corresponds to the location of the word, time-wise, in the message.

The stored information may include the content itself along with meta data that describes each instance of the content. For example, the text "Arcadia Mall" may be stored in association with a label of "venue" or "address" to indicate that the text is of a type that is expected to be correlated with a geographic location or address. Such correlations may be used, as described above and below to permit a user to provide a contextless input, such as a voice input, and to have a context placed on the input using such a correlation, along with a corresponding context placed on the spoken command, where each such application supplies half of the content needed to determine that the address is intended to be an argument or parameter for the command that the user enters.

Thus, for example, in a voice-input system, voice recognition may be more accurate and less taxing on computing resources if a user is only required to speak a predetermined command (e.g., "map that") without having to provide an argument or parameter for the command, and then the system uses the various contexts (e.g., connecting the command to a content type, and connecting the particular instance of text to the same or a corresponding content type) to determine that the user intended the parameter for the command to be the text that is in the transcript.

A playback module 124 is shown receiving information from the sound files data store 111 and the tags data store 110 in order to play a message back to be callee 104 audibly, while at the same time displaying the transcript of the message to the callee 104. A timer 126 is provided with the playback module 124 so as to coordinate the highlighting of information with the playing of that information.

Using the features just described, the message transcript, such as transcript 112 in this example, may be displayed to a user in a "follow the bouncing ball" type of format that will be familiar with students of karaoke or students of the sing-along genre. In such an approach, highlighting in some relevant format is shown traveling across text as the message corresponding to the text is played audibly to a user, so that a user can better visually track their progress through a message or text. In this particular example, the highlighting is provided in the form of a contrasting color that floats over the text from left to right and then moves to a next line in the message 112 when it gets to the right end of a line.

Two levels of highlighting are shown in this example by three different boxes 114A, 114B, and 114C. Box 114A covers the word Arcadia in the transcript, and represents that playback of the message is currently on this word. Box 114A may move in a smooth or jumping fashion from word-to-word in the transcript 112, and may always generally be located over a word that is currently being spoken. The highlighted box 114A may be shown in various manners, such as by changing the background color around the word Arcadia, using the color yellow or other appropriate background color. Alternatively, the text may be changed in color or the text and background may be inverted in color when they are highlighted. As an alternative implementation, the text may be scrolled through an area on the screen, such as in a ticker tape fashion so that the message scrolls through a highlighted area or only a portion of the message is shown at one time. The font of active text may also be changed, such as by bolding the text that currently correspond to the playing message.

Boxes 114B and 114C provide information about the context of the recording around a current location (which is represented by box 114A). In this example, the boxes 114B, 114C provide information about the speed at which the caller 102 was talking when reading a message. Each of the boxes, for example, may be generated to cover a predetermined time in the message, such as one-tenth or one quarter of a second in the message. Thus, box 114B indicates that the user was speaking relatively quickly when they spoke the word "at," but comparatively slower when they spoke the words "Mall we," perhaps because they reached the end of a sentence at that point, which caused them to pause and thus slow down.

Other information about the message and the sound in the message may be displayed using icons that are overlaid with the transcript 112. For example, icon 116 shows an upwardly curving arrow, which may represent a user's intonation moving upward in a hopeful tone. Thus, the intonation can be displayed to the callee in a convenient visual manner. In direct contrast, a downward sweeping arrow 120 indicates a lack of interest in the intonation of the caller 102 for thanking the customer. In a similar manner, icon 118, a letter "L" with an upward arrow, indicates that the caller was louder at that particular point in the message, and icon 122, with a letter "F" and a forward arrow, indicates that the caller started talking faster at that point in the message.

Each of these visual cues may provide valuable information to the callee 104. For example, the transcript allows a user to review a message initially without listening to it, and the meta data about the message shown here can permit the user to make a more informed decision about whether they should listen to the message or simply work off the transcript. Also, coordinated review of the recorded message and the transcript allows for verification by the user of words or phrases in the transcript that may have been inaccurately transcribed. In addition, presentation of the transcript with the message can provide a user with a mechanism by which to see immediately how much of the message remains to be played. The identification of a current word in a transcript, or a phrase around the current word, also permit a user to conveniently identify words or phrases for further actions, such as by automatically placing those words or phrases into search queries.

Figure 2:
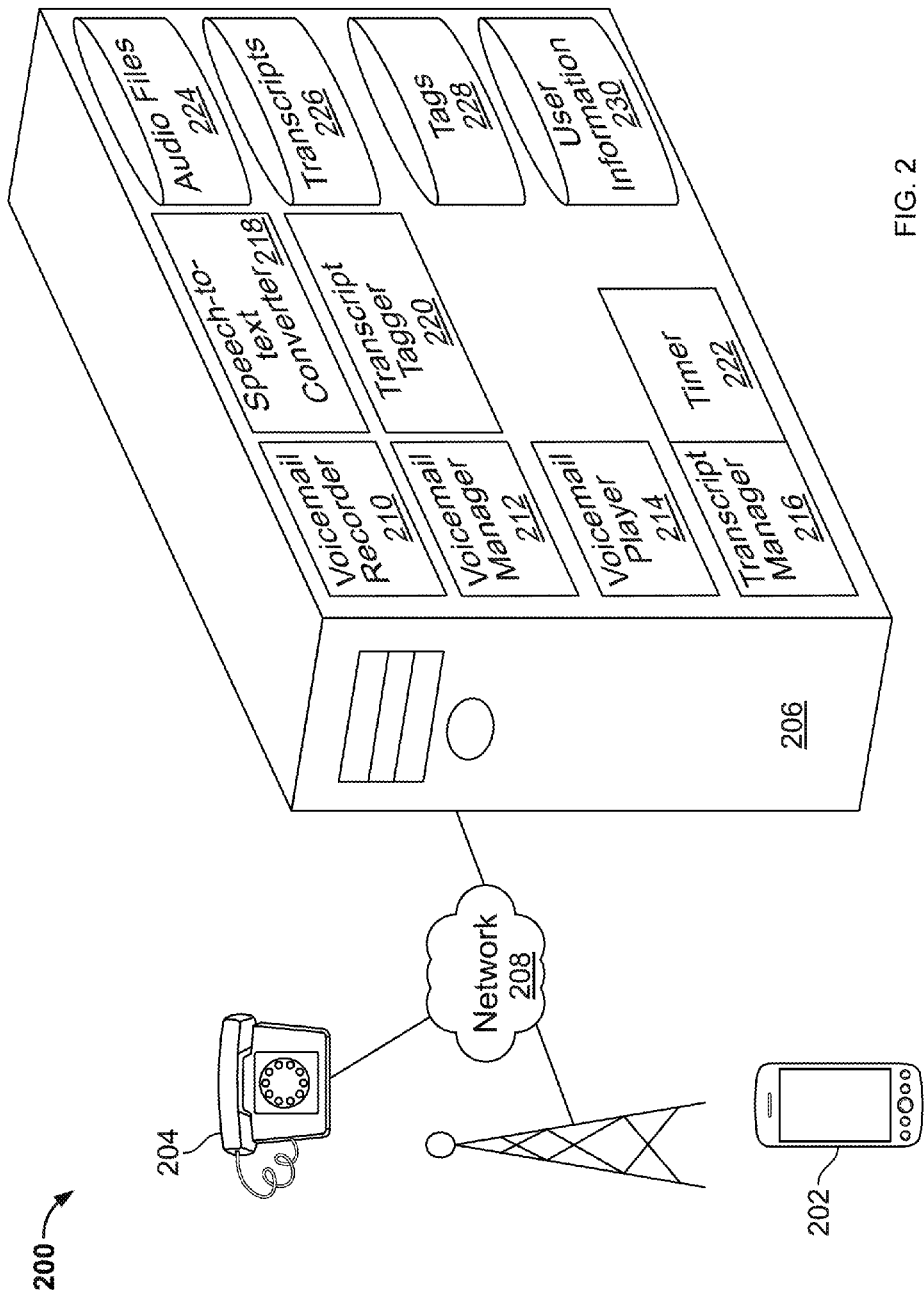
FIG. 2 is a schematic diagram of a voice mail message management system.

FIG. 2 is a schematic diagram of a voice mail message management system 200. The system 200 may be comparable to collection of voice mail components shown in FIG. 1. In general, the system 200 provides for call answering of calls made to a user of a device such as smartphone 202. Such answering may occur, in familiar manners, when the user does not answer a call, or when the user has set their account to indicate that they are out. The system, through a voice mail recorder 210 may make an announcement to the caller, such as a user of telephone 204 (e.g., via an audio recording left by the callee), may beep, and may create a digital audio recording of whatever the caller says. The system may then use a voice mail manager to answer requests from various registered users of the system 200 to review voice mail messages they have received. Such requests may be made, in familiar manners, by telephoning into the system 200 and listening to a menu of choices, or via a voice mail management client on device 202 that may show a list of voicemails that the user has received recently. A voicemail player 214 may respond to commands from the voice mail manager 212 to play certain of a user's voicemails, and may fetch audio files corresponding to those messages from an audio files data store 224. Such files may be stored in a variety of manners, including as individual files that are referenced by a database that tracks the callee, the length of a message, and other relevant meta data about the messages. The messages may be played to a user, either by a voice mail server 206 over an audio channel, or the voice mail audio files may be sent to the device 202 and played on the device 202. Various mechanisms for delivering voice mail messages to client communication devices are well known.

In this example, the system 200 also includes other components so audio of a message may be accompanied by and coordinated with a transcript of the message. Fist, a speech-to-text converter 218 plays received voicemail messages and generates textual transcripts of the words in the messages, which it saves in transcripts data store 226. Each such transcript may be cross-correlated with an audio file in audio files data store 224. The speech-to-text conversion may be performed in a variety of manners. The transcripts may also be time-stamped, so that each word or other item, such as each syllable, in a transcript is correlated to the time during the message at which it was spoken. Such correlation may permit the coordination of a transcript highlighter that may highlight words in the transcript as the corresponding words are being spoken aloud when the audio file is played, as described in more detail below.

A transcript tagger 220 may operate on the transcripts to identify and tag contextual information about the voice mail messages, apart from the particular word in a message that has been converted by the speech-to-text converter. For example, the transcript tagger may perform pitch analysis on the audio files to determine intonation of the caller when leaving a message. Also, the volume or amplitude of the caller may also be identified, and a notation to that effect may be saved along with a timestamp so that the information can be visually conveyed to a user when the transcript is displayed. The speed of the message can also be computed by the transcript tagger 220, though the speed can separately be determined at the time the message is played on device 202 simply by identifying timestamps that are a predetermined time ahead and/or behind the current location, and showing highlighting that reaches to words that are correlated with those time-stamps.

The playback of audio files with coordinated highlighting of transcripts can be performed by voicemail player 214 and transcript manager 216, which are shown here on the server 206, though one or both could be implemented on device 202. The voicemail player may take the form of a basic audio player that is able to communicate its start time and/or its current running time to the transcript manager 216. The transcript manager can alternatively or in addition be provided with a timer 222 for tracking the current time of the playback where the voicemail player 214 reports only a start time, or the transcript manager infers the start time.

The transcript manager may be provided so as to cause the display of a transcript of a voice mail message on the device 202. The transcript may be supplemented with highlighting and/or icons that represent meta data about the voice mail message. For example, highlighting may represent, indirectly, the speed with which the caller spoke (where the speed is the meta data), where the highlighting can extend a certain time period in front of and after the current location (where such time can be computed using timestamps that are indexed to words or syllables in the transcript). Also, inflection, volume, intonation, and emphasis may be displayed, such as by using appropriate icons that may be overlaid on a visual representation of the transcript. Meta data about a word in a transcript, in the form of words that surround that word and that make up a topic, as explained above and below, may also be highlighted, such as by displaying a box around such groups of words and perhaps providing a numbered icon on each box so as to distinguish one group of words (which may be the single word if it alone is determined to represent a topic) from another group of words.

In this manner, the example system discussed here can provide improved user interaction with a system that provides transcripts of information, such as voice mail messages, that are relevant to a user. The user may play the messages audibly while reviewing the transcript, with highlighting traveling across the transcript in time to the playing of the audio. Particular portions of the text may be emphasized or called out visually as portions that can be acted upon, and a user can readily speak commands to perform actions on those portions in a simple manner, in certain implementations.

Though not shown, the server 206 may also include a command correlator or similar structure. The command correlator may have physical logic structures that perform a process of correlating a command with a particular category (e.g., the "map that" command correlates to a "map" or "address" category) and then determine which categories that correspond to instances of text in a document (e.g., the terms "123 Main street" or "Soldier field" may correspond to an "address" category). The comparison of categories may then be made—e.g., "address" may match with "address" and/or "venue" may be deemed to match with "address" also—and the command may then be correlated to the particular text, so that the system 200 causes the command to be executed with the text as a parameter. For example, the system 200 may cause a mobile device to transmit an HTTP address to a remote mapping server, where the parameter for the request is "123 Main street" or "soldier field". (In the former situation, the system 200 may cause the user's present location to also be submitted as a parameter, so that the mapping server may determine which 123 Main street, from among many multiple ones in the world, was intended by the user.)

Also, although described here in the context of transcripts generated with voice mail messages, the system 200 may provide user command functionality like that described above and below in other systems. For example, a word processing application may present terms that can be recognized by a system as having a particular content type, and a user may provide contextualess commands to the application in manners like those discussed here, such as to have those commands applied to text in a word processing document, including by launching other applications (e.g., a mapping application) so that the launched or invoked application overlies the word processing application. Again, the context may be inferred by correlating the command to a particular category, and correlating terms in the text with a particular category, and then determining that the former category correlates to a category for one of the terms in the text.

Figure 3A:
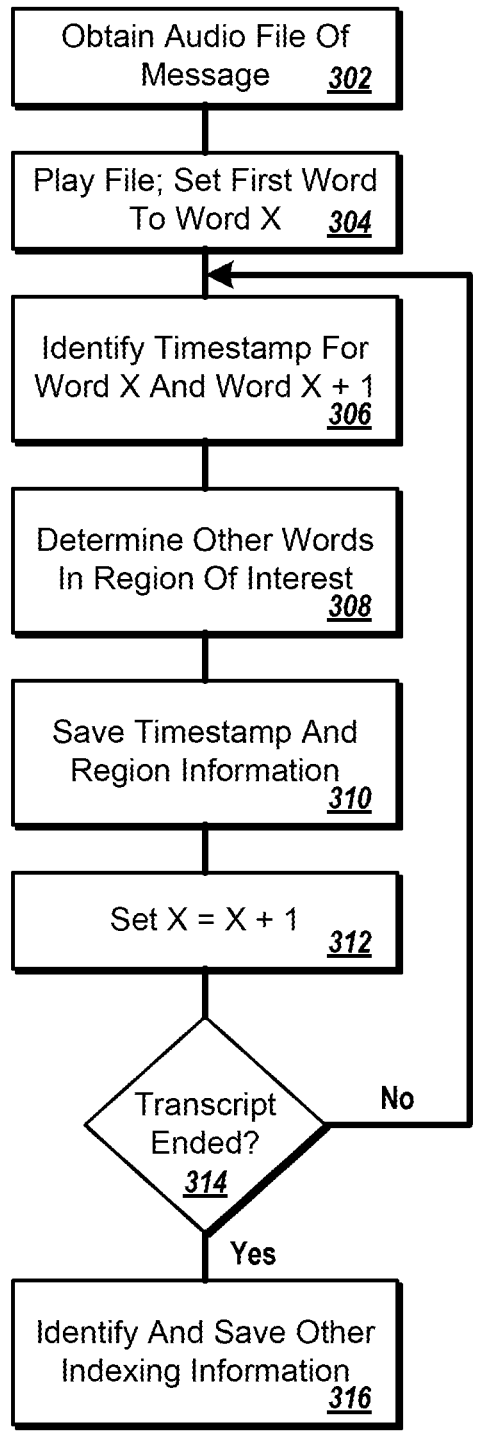
FIG. 3A is a flow chart of a process for coordinating a transcript with a voice mail message recording.

FIG. 3A is a flow chart of a process for coordinating a transcript with a voice mail message recording. In general, the process involves stepping through a transcript, such as when it is created from an audio file, and applying meta data to elements, such as words, in the transcript, including by applying time-stamps to elements in the transcript in a manner that allows those elements to be coordinated in time with the speaking of those elements in the audio file.

The process begins at box 302, where an audio file of a message is obtained. Such a file may be located by identifying messages that are indexed in a voicemail inbox for a user of a system, and that have not yet been analyzed. The process may also obtain additional information along with the audio file, such as information indicating when the message was left, and identifying information for a provider of the message, such as caller identification information.

At box 304, the audio file is played into a speech-to-text converter. Simultaneous with the conversion of the file text in the form of a transcript, or more appropriately at a time slightly after the conversion, tracking information may also be obtained for the transcript. Such tracking information may include information that indicates that particular elements in the transcript, such as words in the transcript, were stated at particular times.

Also, the first word in the transcript may be set to a variable X that is used to step through all of the words in the transcript so as to permit the creation of tracking information throughout the message and the related transcript.

At box 306, the process identifies a timestamp for the first word and a timestamp for a second word that immediately follows the first word. The timestamps indicate the time in the progression of the audio file in which the caller spoke each respective word, a time at which each worded ended, or another time, as examples. Alternatively, a timestamp may be provided for each syllable in a word, or each phrase in a sentence. Timestamps may also be initiated on a repeating periodic basis, such as every quarter second, that the word in the message that is being spoken.

The process then, at box 308, determines other words in the region of interest around the current word. Such other words may be determined by analyzing meta data associated with the audio file, such as speed data that represents speed with which the caller is speaking on each side of the point of interest, intonation data, and other data that may be relevant to a user's visual review of the transcript.

In addition, the analysis may involve textual analysis to identify groupings of words in the transcript. Such analysis may require a full transcript first be produced in order that all the relevant words to be considered. Such grouping analysis may include various familiar forms of Bayesian analysis and other analysis directed toward identifying groups or patterns in group of words, and comparing to other training documents that may contain similar patterns. The system may also be trained for particular types of groupings, such as common names, addresses, product names, and similar items.

At box 310, the process saves the timestamp information and the region information. The timestamp information may be saved, for example, assigning an integer to each word in a message, and saving a timestamp along with each integer in a table of a database, so that the time associated with each word can be readily looked up in the table, and in simple succession. The region information may likewise be keyed to a particular word integer, and may additionally include data required to identify the range. For example, a cluster of words may extend from word 4 to word 8, and it may be assigned to each of words 4, 5, 6, 7, and 8. Where multiple regions overlap, a particular word that is in both regions may be represented in the table twice.

At box 312, the value of X is incremented so that the process moves onto analyzing the next word or other item in the transcript. At box 314, the process checks to determine whether the entire transcript has been analyzed, and if it is not, the process returns to step 306, though in this instance the timestamp of the current word would have been previously checked, so a timestamp of a next word may be the only needed determination.

If the transcript has ended, the process at box 316 identifies and saves other indexing information related to the message. For example, summary information may be generated for the message and may be used to present the transcript or other information to a user. As one example, the general volume level, or amount of change in volume (from softest to loudest) in the message may be determined and may be used to indicate a mood of the caller, and additionally to help screen a call as being potential voice mail spam, since sales pitches may be provided at a particular volume level. Also, the number or frequency of upward or downward inflections in a message may be stored and used for analysis of the message. Various other data about the message may also be compiled and stored.

Figure 3B:
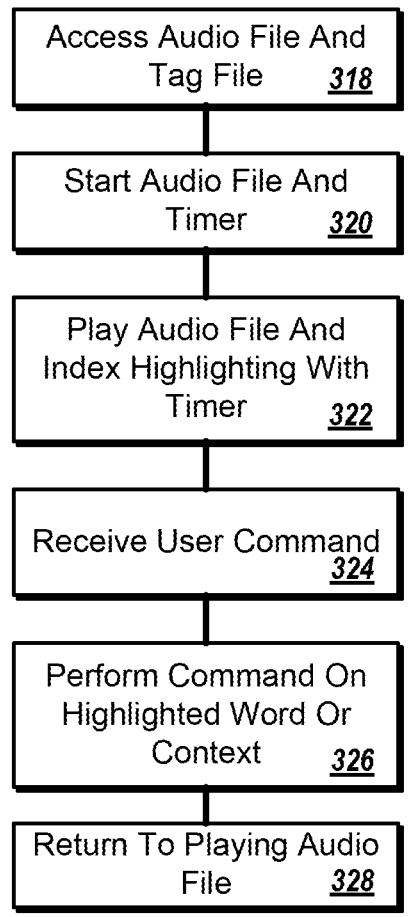
FIG. 3B is a flow chart of a process for displaying a transcript in coordination with a voice mail message recording.

FIG. 3B is a flow chart of a process for displaying a transcript in coordination with a voice mail message recording. In general, the process involves playing a voicemail message in coordination with displaying particular information in a transcript of the voicemail message as the message is played. Such additional information may include highlighting the current location that is being played in the message, and also identifying other characteristics of the message, such as by highlighting additional areas on each side of the currently playing area, so as to indicate, for example, the speed at which the message was recorded in that area. In addition, clusters of words may also be highlighted so that the user may conveniently select a word for further processing, such as for the submission of the word group or cluster to one or more different types of search engines.

The process begins at box 318, where an audio file or files are accessed for playback to a callee who is the intended recipient of a voicemail message. The audio file may be retrieved in a familiar manner and may be played by a server over a voice channel of a device having telephony capabilities, or may be provided to the device as a native audio file that can be played back on the device, such as on a smart phone. The file may take a variety of forms, and may include information that correlates timestamps in the audio file with locations of words in a transcript of the audio file. The transcript may also be obtained and handled separately from the audio file.

At box 320, the process starts the audio file and a timer that tracks elapsed time for playing the audio file. At box 322, the process plays the audio file and indexes highlighting on a transcript of the audio file using the timer. Such indexing may occur by using a table like the table discussed above, where the process steps through timestamps in the table that are correlated with keys for each word in the transcript. When each successive timestamp is reached, the process changes the highlighting to the word in the transcript that corresponds to the integer for that word in the table. In one instance, the highlighting may simply involve providing the word on a graphical display of a smart phone or other computing device in a color that differs from surrounding words in the transcript.

Additional information may be provided along with the highlighting of the current location in the transcript. One example of such additional information may include highlighting around a current position in the transcript, as discussed above, so as to indicate a speed at which the message was left in that location, a caller's intonation at that point, the caller's volume at that point, or other such information. Speed may be indicated by selecting a time on each side of the time for the current word, identifying in the table the two timestamps relating to those times, finding the words that correspond to those time stamps in the table, and generating highlighting (perhaps of a different shade or color from the main highlighting) that extends out to those two words, and away from the center word.

At box 324, the process receives a user command relating to the message in the transcript. For example, the user may speak into their smart phone the word "stop" in order to cause the playback of the message to stop at its current location. Such a spoken command may cause the highlighting to be frozen in its current location also. As a result, a particular word may be highlighted, and a particular group of words around that word may also be highlighted. The user may then speak additional commands to indicate an intent to perform an action with respect to the highlighted word or group of words. Such a command may be formed as a subject-verb, or verb-subject command in a familiar manner. For example, if the transcript is positioned in the middle of a person's name, the user may speak the command "social that," which may cause the name that makes up the group to be submitted to a social networking site, so that the user may receive a display of the social homepage for the person whose name is at that position in the transcript.

In addition, as shown at box 326, the command may be performed on the highlighted word or context around the word, such as a group of words around or near the word—without additional identification of the target for the command by the user. Certain context of the message may also be used to improve the performance of certain commands. For example, if a command involves making a communication (e.g., email or telephone call), the system may initially and automatically suggest an address or telephone number for the caller (e.g., as identified from caller ID information and/or information in a contacts database or on-line database) or a location, person, or organization mentioned in the message. In this manner, the user can quickly select a target for such a communication command, and may do so on a pre-populated menu or with more accurate voice recognition (where the command is entered using voice) because the candidate choices can be narrowed by the context of the message.

Each group of words in a transcript may also be indicated for selection by the user separate from whether the playback of the transcript is currently at that cluster. For example, a small icon that contain an index number may be placed next to each group of words, and the user may speak the number as a subject in a verb-subject command, in order to have the verb performed on that group of words. For example, a user, before playing back a message, maybe be shown a transcript of the message, and the message may have five different groups of words that have been previously recognized in the transcript via analysis like that discussed above. The user may then enter a command such as "search four" in order to have the words in the fourth group submitted to a general Web search engine, and to receive search results in return. Other similar mechanisms may also be provided to permit a user to conveniently select groups of items in a transcript and perform particular actions on those items.

At box 328, after the command has been performed as indicated by the user, the process may return to playing the audio file. A voicemail presentation application may have remained in the background while the user was performing the command, such as while the user was reviewing search results on a web page. The voicemail presentation application may return to the focus of the device when the web page or other application is closed. The user may then resume playing of the message by stating a command such as "play," or may perform another command on the initial group of words or a new group of words from the transcript.

Thus, using the techniques described here, a user of a computing device such as a mobile smart phone may be able to conveniently access data relating to information in a voice mail message that has been left for them by another user. They may also do so in a hands-free fashion, where they do not need to touch a display screen, because the range of grouped words has been identified for them by the process. As a result, the user may have faster access to data, may access more data than they otherwise would be able to access, may have a richer user experience, and may do so without having to provide unnecessary attention to their computing device.

FIG. 4 shows lists of verbs and subjects that a user may employ in commands to a voice mail management system. The various listed terms provide examples of the sort of actions that a user may take with respect to a term or phrase in a transcript. For example, a user may choose to search on the web for a particular term in a transcript, to map a geographic point that is mentioned in the transcript, or to receive driving directions from their current location to the geographic point, by speaking the commands, respectively, "search," "map," and "navigate." Likewise, a user may submit a group of words in the transcript to a shopping search engine by speaking "shop" or "buy," and can search for tickets relating to an event in a transcript by speaking "tickets" or "tix." A user may also cause content from the transcript to be provided to another application. For example, a user may speak "email" in order to have the whole transcript or a part of the transcript such as a highlighted part, copied into the body of an email (and may act similarly for text messaging or chat).

The subjects in FIG. 4 are various representations for the items shown in a transcript, from a single word ("word") to the entire transcript ("message"). Some of the subjects are particular topics rather than zones in a message. For example, by speaking the word "address" as a subject, the user can have the system act only on a group of words that represents an address in the transcript, and not on any other groups of words that may have been identified by the system.

Thus, for example, a user who speaks "ticket event" may cause the system to identify an event in a transcript (looking, for example, for the nouns "game," "movie," "play," and "show") and then submit information for that event to a ticketing agent to return to the user an indication of the price and availability of tickets for the event. In this manner, if one spouse leaves a message (which may be voice mail but could also simply be an email message) suggesting that a couple thinks about going to an event, the other spouse can quickly get information about the event, and make a suggestion in response to the first spouse, using that easily obtained information, as one simple example.

Commands may be provided in other ways also, including by selectable on screen controls that are displayed along with a transcript, as shown next.

Figure 5:
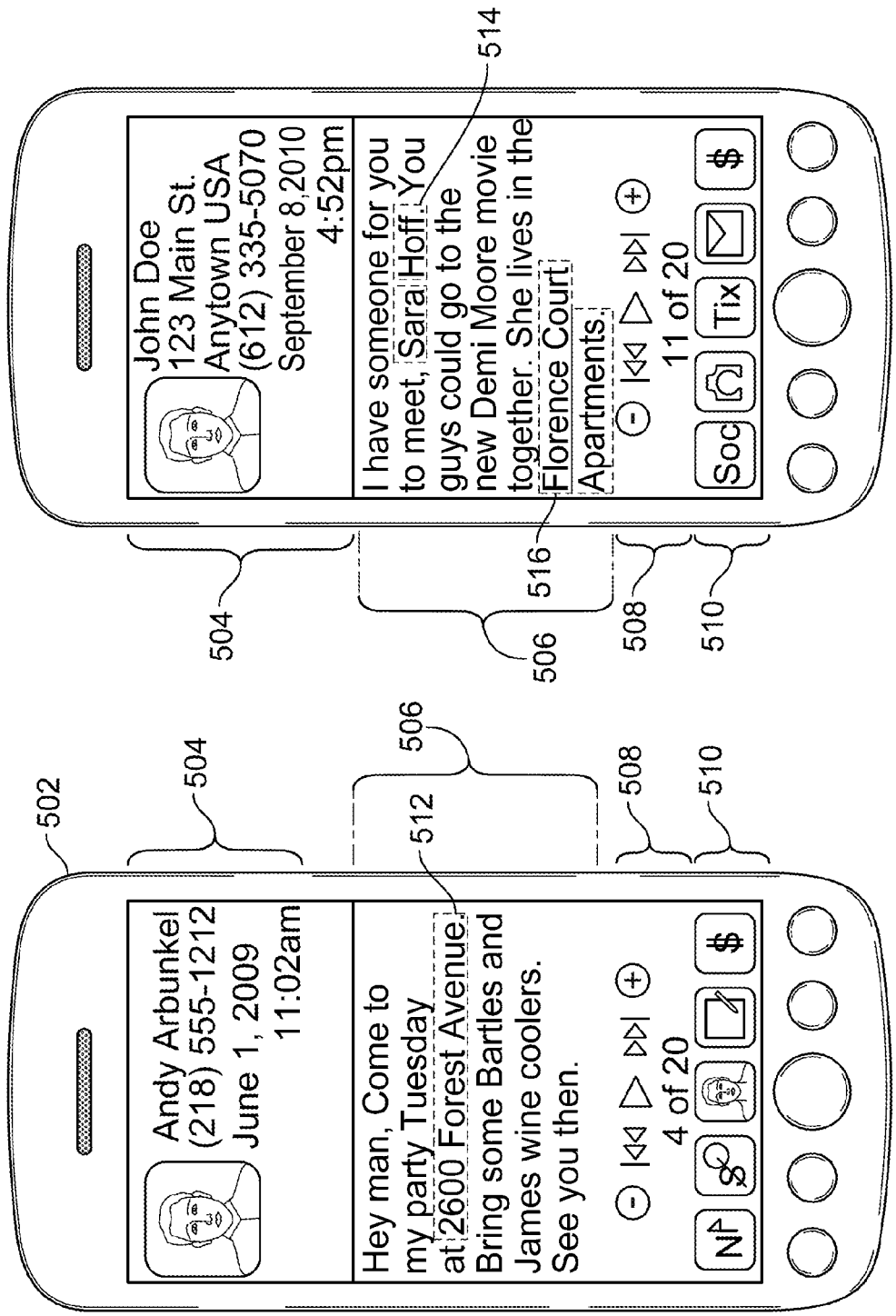
FIGS. 5A and 5B are screen shots of example smart phone displaying a voice mail messaging system having coordinated transcript display and transcript-based commands.

FIGS. 5A and 5B are screen shots of an example smart phone displaying a voice mail messaging system having coordinated transcript display and transcript-based commands. In FIG. 5A, a device 502, in the form of a touch screen smart phone, is shown presenting a voicemail message to a user of the device 502. Area 504 at the top of a graphical display on the device 502 shows information about the caller, including the caller's name, telephone number, and the time at which the message was left. A main area 506 of the display shows the text transcript of the message, which may have previously been generated by a speech-to-text converter system, and then analyzed to identify locations within the transcript that relate to the audio file. A box 512 is shown in dashed lines around a street address in the middle of the transcript to indicating highlighting of such text, thus indicating that the message is currently playing, and is at that location in the transcript, or alternatively indicating that a textual analysis of the transcript has identified the group of three words as being of interest and relating to each other.

A control area 508 shows controls that a user may touch in order to affect the playback of voicemail messages. For example, the user may play a message, pause a message, fast-forward through a message, or jump to a previous or next message. The total messages and the number of the current message in that group are also shown for reference by the user.

A command bar 510 is shown at the bottom of the display and includes graphical icons indicating to a user of the device 502, various commands that may be performed in the context of the display on device 502. The icons may have previously been identified by the operating system, or customized by the user, to represent commands are frequently used in relation to the review of voicemail transcripts. Alternatively, or in addition, the icons may be dynamically generated in response to the current content of the transcript. For example, in the transcript area 506, an address has been identified. The system may thus select and present icons that launch location-relation actions, such as mapping, driving directions, and navigation. As one example, the leftmost icon shows the letter N with an upward arrow, indicating a north, and thus representing a mapping application.

A user may touch one of the icons in order to perform an operation relating to an item in the transcript. For example, with respect to the transcript shown here, a single cluster of words has been identified, so that any operation by a user may be applied automatically to those words. Other icons shown in the command bar include, from left to right, an icon to perform a Web search, an icon to search a social network for a person's name, an icon to place text in a notepad, and an icon to perform a product search. Keys on the device 502 may be aligned below the icons, so that the user may make a selection either by pressing the icon on the screen or by pressing the key that is aligned with the icon.

In certain instances, the selection of an icon may not generate satisfactory results with respect to a particular identified group of words. For example, in the transcript shown in FIG. 5A, if a user selects the product search, such an operation may not apply properly to the address shown at box 512. In such a situation, the search results returned by submitting the address to a product search engine may have a low quality indicator, and that low quality indicator may be interpreted by the system as an indication that the identified group of words is not applicable to the identified operation. In such an instance, the system operating on device 502 (or a server communicating with device 502) may look for other words or groups of words in the transcript that are more suited to the selected operation, under the assumption that the user did not intend to perform the selected operation on the previously-identified words or group of words. Thus, in this example, such a process may identify the noun "wine coolers," and the proper noun "Bartels and James wine coolers" in the transcript, and may submit such terms to the product search engine instead of the highlighted term.

The commands relating to the command bar 510 may also be spoken by a user, so that the user can operate the device 502 hands-free. For example, the user may state "map that," as indicated above, in order to be shown a mapping application centered on 2600 Forest Avenue. Other example spoken commands are shown in relation to FIG. 4.

Ambiguities in the text may be resolved by reference to data that is external to the transcript. For example, for mapping searches, the state or town for the search may be inferred to be an area near the current location of the device 502 (as determined by making a call to a GPS module on device 502), or a location of the caller, as inferred from the caller's area code or from address information that may be associated on the device 502 with the caller (e.g., in a contacts database).

FIG. 5B shows another example screen display for a transcript of a voice mail message, where the display is formatted in the same manner as the display in FIG. 5A. In this instance, the call is from another user named John Doe, and the device 502 includes address information for John, such as by using the caller identification telephone number for the incoming call to look up a contact in a contacts database, and then to determine the address from the matching contact.

In this instance, two different items have been highlighted in the transcript, based on word analysis of the transcript. The first item 514 is the name of a woman that the caller knows, while the second item 516 is the name of an apartment complex. Again, other controls are shown on the display for playing the message, pausing the message, skipping to a next message, and the like.

The command bar 510 in this example shows icons for, from left-to-right, a social networking site, an image search site, a site for finding tickets, an email application, and a shopping search site. Thus, the user of device 502 may press the "Soc" button in order to have a search conducted for Sara Hoff on a social networking site, so that the user can introduce himself or determine if her interests match his interests, and also to determine whether they have additional common friends. Similarly, a selection of the camera icon may cause the system to determine whether the command was intended for the woman's name or the apartment complex (where the transcript is not currently paused over one of them), and the relevant string may be submitted to an image search engine, with the results being displayed on the device. After viewing the images, the user may minimize or close the browser application that fetched the images, and may be faced again with the display of FIG. 5B.

Similarly, the user may select the "tix" icon to check the availability of seats for the Demi Moore movie mentioned in John's message. Such an operation may return inadequate results for the woman's name and the apartments, so the system may analyze the message again for entertainment-related terms, and may locate "Demi Moore movie" as a result. The system may then generate a web page showing local show times (using information indicating a location of the user, such as a profile for the user that lists a hometown, or using GPS data from the device 502) for whatever movie is currently in release and that stars Demi Moore.

Using the other icons, the user could have the selected text or the entire transcript posted into an email message. The device may infer an intended addressee of the message as being either John Doe or Sara Hoff (since Demi Moore is not in the user's contact list nor is her email available from a social networking site), and may ask the user to identify which of the two addressees is intended. The user may then dictate a short message to his fiend, John Doe, such as, "Have you ever been to the FloCo Apartments? They smell!"

Thus, by this example, the user of device 502 can quickly get his dating life in order, and possibly without performing a single keystroke. He can move through a variety of voice mail messages without having to listen to the messages if the transcripts are adequate, and with being able to see the messages and hear the messages in coordination as they are played. Moreover, he can act on the information quickly in a way that is automatically tuned to the particular user's context.

Figure 6:
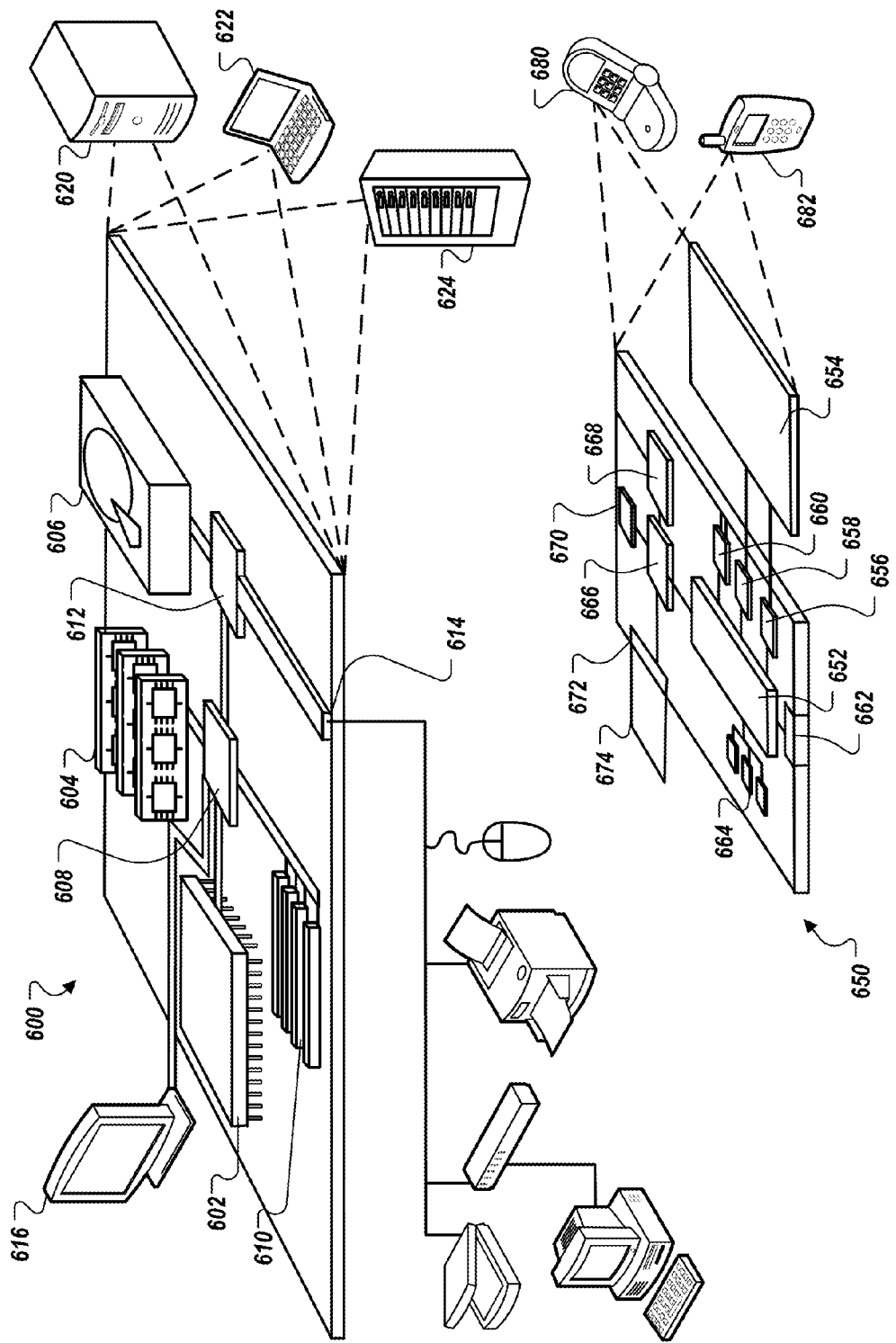
FIG. 6 is an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented voice mail method, comprising:
   obtaining an electronic audio file of a recorded user message directed to a telephone user;
   automatically generating a transcript of the recorded user message;
   in response to receipt of a first spoken phrase from a user of a computing device on which the electronic audio file is played, identifying (a) a first category to which the first spoken phrase is directed, (b) first one or more words in the transcript that correspond to the first category, and (c) a first command that corresponds to the first category; and
   providing data to cause the identified first command to be performed automatically using the identified first one or more words as parameters for the identified command;
   wherein the first spoken phrase does not identify the one or more words in the transcript.

2. The method of claim 1, wherein obtaining the electronic audio file comprises receiving an incoming telephone call and routing the incoming telephone call to a voice mail message system.

3. The method of claim 1, wherein automatically generating the transcript of the recorded user message comprises submitting the recorded user message to a speech-to-text conversion system.

4. The method of claim 1, further comprising providing, in coordination, the recorded user message audibly to the telephone user and the transcript visually to the user.

5. The method of claim 4, wherein providing the transcript in coordination with the recorded user message comprises moving a highlighted area across the transcript in a manner that matches a current location in the user message while it is played.

6. The method of claim 1, wherein the first command comprises a web search, the first category is a group of contiguous words category, and the first one or more words in the transcript comprise a group of contiguous words in the transcript.

7. The method of claim 1, wherein the first category is an address category, the one or more words in the transcript comprise an address, and the first command is a command to generate a map for a geographic area around the address.

8. The method of claim 1, wherein the first command comprises a command to send a communication, the first category is a recipient category, and the one or more words in the transcript comprise a recipient.

9. A computer-implemented voice mail system, comprising:
   an audio file data store storing a plurality of digitized voice mail message directed to one or more users of the voice mail system;
   a transcript data store storing a plurality of voice mail transcripts, each corresponding to a voice mail message stored in the audio file data store; and
   a voice mail player including an audio player and a transcript manager programmed to:
     in response to receipt of a first spoken phrase from a user, identify (a) a first category to which the first spoken phrase is directed, (b) first one or more words in the transcript that correspond to the first category, and (c) a first command that corresponds to the first category; and
     provide data to cause the identified first command to be performed automatically using the identified first one or more words as parameters for the identified command;
   wherein the first spoken phrase does not identify the one or more words in the transcript.

10. The system of claim 9, further comprising a voice mail recorder to terminate an incoming telephone call, provide instructions to a caller of the call, and receive and store a message from the caller in the audio file data store.

11. The system of claim 10, further comprising a speech-to-text converter programmed to generate a transcript that exhibits the voice mail message from the caller, and to store the transcript in the transcript data store.

12. The system of claim 9, wherein the audio file data store and the transcript data store share a common data structure.

13. The system of claim 9, wherein the voice mail player is programmed to provide the transcript in coordination with the recorded user message by moving a highlighting across the transcript in a manner that matches a current location in the voice mail message while it is played.

14. The system of claim 9, further comprising a user device that is programmed to receive the first spoken phrase.

15. The system of claim 9, wherein the first command comprises a web search, the first category is a group of contiguous words category, and the first one or more words in the transcript comprise a group of contiguous words in the transcript.

16. The system of claim 9, wherein the first category is an address category, the one or more words in the transcript comprise an address, and the first command is a command to generate a map for a geographic area around the address.

17. The system of claim 9, wherein the first command is a command to send a communication, the first category is a recipient category, and the one or more words in the transcript comprise a recipient.

18. A computer-implemented voice mail system, comprising:
   an audio file data store storing a plurality of digitized voice mail message directed to one or more users of the voice mail system;
   a transcript data store storing a plurality of voice mail transcripts, each corresponding to a voice mail message stored in the audio file data store; and
   means for,
     in response to receipt of a first spoken phrase from a user, identifying (a) a first category to which the first spoken phrase is directed, (b) first one or more words in the transcript that correspond to the first category, and (c) a first command that corresponds to the first category; and providing data to cause the identified first command to be performed automatically using the identified first one or more words as parameters for the identified command;

wherein the first spoken phrase does not identify the one or more words in the transcript.

19. A computer-implemented method, comprising:

displaying textual content on a computing device, the textual content containing one or more terms that each have associated with them a content type that corresponds to a category to which the particular term is directed;

receiving a first spoken phrase from a user of a computing device;

identifying, in response to receiving the first spoken phrase, (a) a first category to which the first spoken phrase is directed, (b) first one or more words in the textual content that correspond to the first category, and (c) a first command that corresponds to the first category; and causing the identified first command to be performed automatically using the identified first one or more words as parameters for the identified command;

wherein the first spoken phrase does not identify the one or more words in the textual content.

20. The method of claim 19, wherein the textual content comprises a transcript of a voicemail message received by the computing device.

21. The method of claim 19, wherein the first category is selected from a group consisting of personal name, address, organization name, date, shipping tracking number, ISBN number, state, city, country, and venue name.

22. The method of claim 19, wherein receiving a first spoken phrase comprises receiving a voice input on the computing device.

23. The method of claim 19, wherein the first spoken phrase takes the form of "[command] that,".

24. The method of claim 19, wherein the first one or more words in the textual content are highlighted compared to other displayed textual content so that the user can see which displayed terms are subject to commands.

25. The method of claim 19, further comprising displaying the first command with the displayed textual content so that the user can see the first command that can be executed on the displayed content.

26. The method of claim 19, further comprising determining that a plurality of one or more words correspond to the first category, and providing a control for the user to select one of the plurality of one or more words to be the first one or more words.

27. The method of claim 19, further comprising invoking an application that corresponds to the first command, and displaying content with the invoked application, wherein the content is responsive to the first one or more words.

28. A computer-implemented system, comprising:

a text document data store storing one or more textual documents, the textual documents including one or more terms that each have associated with them a content type that corresponds to a category to which the particular term is directed;

an interface programmed to display a textual document and to receive a first spoken phrase from a user; and a command correlator to:
identify, in response to receiving the first spoken phrase, (a) a first category to which the first spoken phrase is directed, (b) first one or more words in the textual document that correspond to the first category, and (c) a first command that corresponds to the first category; and cause the identified first command to be performed automatically using the identified first one or more words as parameters for the identified command;

wherein the first spoken phrase does not identify the one or more words in the textual document.

29. The system of claim 28, wherein the textual document comprises a transcript of a voicemail message, wherein the transcript is time-correlated to an audio file of the voice message.

30. The system of claim 28, wherein the first category is selected from a group consisting of personal name, address, organization name, date, shipping tracking number, ISBN number, state, city, country, and venue name.

31. The system of claim 28, wherein the first spoken phrase takes the form of "[command] that,".

32. The system of claim 28, wherein the first one or more words in the textual document are highlighted compared to other displayed textual content so that the user can see which displayed terms are subject to receiving commands.

33. The system of claim 28, wherein the system is programmed to display the first command with the displayed textual content so that the user can see the first command that can be executed on the displayed content.

34. The system of claim 28, wherein the system is further programmed to determine that a plurality of one or more words correspond to the first category, and to provide a control for the user to select one of the plurality of one or more words to be the first one or more words.

35. The system of claim 28, wherein the system is further programmed to invoke an application that corresponds to the first command, and to display content with the invoked application, wherein the content is responsive to a selected first one or more words.

36. The method of claim 1, further comprising:

in response to receipt of a second spoken phrase from a user of a computing device on which the electronic audio file is played, identifying (a) a second category to which the second spoken phrase is directed, (b) second one or more words in the transcript that correspond to the second category, and (c) a second command that corresponds to the second category; and wherein the first spoken phrase comprises the first command and an additional term, and the second spoken phrase comprises the second command and the additional term, and wherein the first one or more words in the transcript are different than the second one or more words in the transcript.

37. The method of claim 1, wherein the first spoken phrase comprises the command and one or more words to which a system that performs the identifying receives in association with different commands, and for which the system selects different words in the transcript, the selection depending identifying which of the plurality of commands is in the spoken input.

* * * * *

UNITED STATES PATENT AND TRADEMARK OFFICE
CERTIFICATE OF CORRECTION

| | | |
|---|---|---|
| PATENT NO. | : 8,588,378 B2 | Page 1 of 1 |
| APPLICATION NO. | : 12/837322 | |
| DATED | : November 19, 2013 | |
| INVENTOR(S) | : Benedict Davies and Christian Brunschen | |

It is certified that error appears in the above-identified patent and that said Letters Patent is hereby corrected as shown below:

On the Title Page:

Item (57) (Abstract), line 9, after "one or" insert -- more --.

Signed and Sealed this
Eleventh Day of March, 2014

Michelle K. Lee
*Deputy Director of the United States Patent and Trademark Office*